United States Patent [19]
Tomi et al.

[11] Patent Number: 5,645,759
[45] Date of Patent: Jul. 8, 1997

[54] LIQUID CRYSTAL COMPOSITION AND A LIQUID CRYSTAL DISPLAY ELEMENT USING THE SAME

[75] Inventors: Yoshitaka Tomi; Etsuo Nakagawa; Shinichi Sawada, all of Chiba, Japan

[73] Assignee: Chisso Corporation, Osaka-fu, Japan

[21] Appl. No.: 524,441

[22] Filed: Sep. 6, 1995

[30] Foreign Application Priority Data

Sep. 6, 1994 [JP] Japan .................... 6-238555

[51] Int. Cl.$^6$ .................... C09K 19/30; C09K 19/12; C09K 19/20; G02F 1/13
[52] U.S. Cl. .................... 252/299.63; 252/299.66; 252/299.65; 252/299.67; 349/182
[58] Field of Search ............ 252/299.63, 299.66, 252/299.65; 359/103

[56] References Cited

U.S. PATENT DOCUMENTS

| | | | |
|---|---|---|---|
| 5,032,313 | 7/1991 | Goto et al. | 252/299.63 |
| 5,308,541 | 5/1994 | Hittich et al. | 252/299.63 |
| 5,358,662 | 10/1994 | Hirose et al. | 252/299.63 |
| 5,368,772 | 11/1994 | Rieger et al. | 252/299.63 |
| 5,409,637 | 4/1995 | Rieger et al. | 252/299.63 |
| 5,480,581 | 1/1996 | Plach et al. | 252/299.63 |
| 5,487,845 | 1/1996 | Reiffenrath et al. | 252/299.63 |

*Primary Examiner*—Cynthia Harris Kelly
*Attorney, Agent, or Firm*—Wenderoth, Lind & Ponack

[57] ABSTRACT

A liquid crystal composition having a low threshold voltage and a suitably large optical anisotropy, while retaining a high specific resistance value, is provided, which composition is composed of compounds expressed by the formulas (1), (2) and (4):

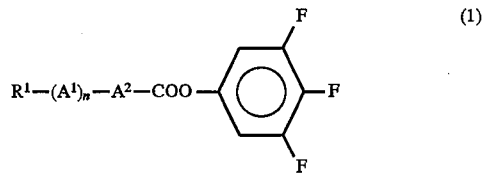

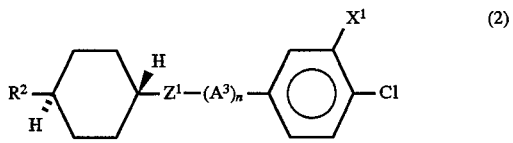

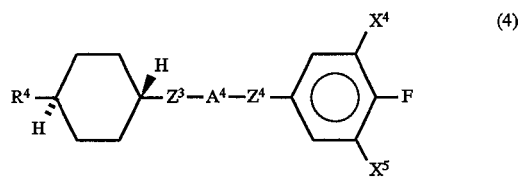

wherein $R^1$, $R^2$ and $R^4$ each represent an alkyl group of 1 to 10C; n represents 0 or 1; $A^1$, $A^2$, $A^3$ and $A^4$ represent trans-1,4-cyclohexylene or 1,4-phenylene; $Z^1$, $Z^3$ and $Z^4$ represent —$C_2H_4$— or a single bond; and $X^1$, $X^4$ and $X^5$ represent H or F, use of which composition can realize an active matrix type liquid crystal display element of a low drive voltage, a low power consumption and a high speed response.

21 Claims, No Drawings

LIQUID CRYSTAL COMPOSITION AND A LIQUID CRYSTAL DISPLAY ELEMENT USING THE SAME

BACKGROUND OF THE INVENTION

1. Field of the Invention

This invention relates to a liquid crystal composition for liquid crystal display. More particularly, it relates to a liquid crystal composition used for a display element employing active matrix mode, and a liquid crystal display element using the same.

2. Description of the Related Art

The liquid crystal display device (LCD) makes possible lower power consumption, smaller type and lighter weight; hence it has been utilized for handy type electronic calculator, digital watch, etc. At present, an active matrix LCD (AM-LCD) such as TFT (thin film transistor), advanced in high precision (high contrast) and colorization, has been expected as a prospective superior product for use in the LCD display method.

As the AM-LCD actuation mode, a nematic (TN) display mode has been employed, wherein the aligning direction of molecules of liquid crystal phase filled between two upper and lower substrates in a cell is twisted by 90°. General conditions sought for the liquid crystal substance used for LCD of TN display mode consist in that the substance exhibits a liquid crystal phase within a temperature range as broad as possible, around room temperature; it is sufficiently stable to environmental factors used; and it is provided with sufficient physical properties for driving the display element. At present, however, a single substance satisfying these conditions has not yet been found; hence several kinds of liquid crystal compounds and if necessary, non-crystalline compounds are blended to prepare a liquid crystal composition having various characteristics, which has been used as a material for LCD.

In the case of AM-LCD, main characteristics sought for the nematic liquid crystal composition used for AM-LCD are as follows:

1) a smaller threshold voltage,
2) a higher specific resistance i.e. voltage retention at service temperature;
3) a suitably larger optical anisotropy ($\Delta n$), etc.

Among these characteristics, the threshold voltage of 1) is a characteristic required for realizing reduction of the driving voltage of AM-LCD. In recent years, LCD has also been used for note type, personal computer, etc. characterized by being portable in a small type and light weight. These equipments aiming at portable use are restricted by driving electric source; hence it is necessary for further light-weight to make the device for electric source smaller. Thus, LCD, too, should be driven at a lower voltage. Accordingly, as the liquid crystal material, it has been necessary to lower the threshold voltage among electrooptical characteristics.

The specific resistance, i.e. the voltage retention of the above 2) is a characteristic required for realizing an AM-LCD having a high contrast and a high reliability. When the specific resistance, i.e. the voltage retention is low, a display unevenness and contrast reduction occur; hence this has a bad effect upon the reliability of the display element. Heretofore, compounds having a cyano group at its terminal have been used as a component of the liquid crystal composition, because the polarity of the cyano group induces a high dielectric anisotropy in the molecule and this has been regarded as effective for lowering the threshold voltage of the liquid crystal composition. However, as described in Comparative example of Japanese patent application laid-open No. Hei 2-289682, since these compounds lower the specific resistance of liquid crystal composition, they cannot be used for AM-LCD requiring a reliability higher than that of conventional ones. At present, a liquid crystal composition containing no compound having cyano group and exhibiting a higher specific resistance, i.e. a higher voltage-retention at service temperature has been sought.

The optical anisotropy of the above 3) is a characteristic related to the contrast of AM-LCD.

In the case of TN display mode, as reported by G. Bauer in Liq. Cryst, 63, 45 (1981), it is necessary for preventing occurrence of interference fringes on the cell surface, to establish the product of the optical anisotropy ($\Delta n$) of a liquid crystal material filled in a cell by the cell thickness (d $\mu m$), $\Delta n \cdot d$ of LDC, to a specified value (for example, $\Delta n \cdot d = 0.5$ $\mu m$ or $\Delta n \cdot d = 1.0$ $\mu m$, etc.).

In short, if $\Delta n$ is not an adequate value, there occurs a problem of inferior contrast.

Recently, the liquid crystal composition used for AM-LCD is intended to increase $\Delta n$, in addition to so far sought characteristics, because, this leads to increase in the response speed of AM-LCD. LCD should be capable of being driven at a response speed as fast as possible, and it is well known that the response time of LCD is proportional to the viscosity of liquid crystal and the square of the cell thickness of LCD. Thus, in order to increase the response speed of LCD, it is necessary to decrease the viscosity of the liquid crystal or to shorten the cell thickness of LCD. When the cell thickness is reduced, a liquid crystal composition having a large $\Delta n$ is required. When such a liquid crystal composition is used, it is possible to reduce the cell thickness of LCD, and shorten the response time.

Japanese patent application laid-open No. Hei 2-289682 discloses liquid crystal compositions having the object of, in addition to the characteristics of low current consumption and high specific resistance, characteristics of low viscosity and suitable, positive dielectric anisotropy, and further, to afford a liquid crystal display element having a high reliability and a high display contrast. These liquid crystal compositions have a high specific resistance i.e. a high voltage retention at service temperature and hence can be used for AM-LCD, but have a drawback that the threshold voltage is high, so that they are insufficient to be used for portable AM-LCD.

As a liquid crystal composition having overcome the drawback of the liquid crystal compositions disclosed in the above Japanese patent application laid-open No. Hei 2-289682, a liquid crystal composition having a relatively low viscosity and a low threshold voltage, while retaining a high specific resistance and a low current consumption, and a liquid crystal display device using the above liquid crystal composition and having a high contrast, a high reliability, a relatively short response time and effecting a low voltage drive, is disclosed in WO94/03558. This liquid crystal composition has characteristics of a high voltage retention at service temperature and a low threshold voltage, but it has a drawback that since the optical anisotropy is small, it is impossible to reduce the cell thickness of LCD and hence it cannot satisfy to the requirement of further raising the response rate.

As described above, it is the present status that as a liquid crystal required for the present AM-LCD, one which is driven at a low voltage, while retaining a high voltage retention, and has a suitably large optical anisotropy has been earnestly desired.

The object of the present invention is to provide a liquid crystal composition which is reduced in the threshold voltage, while retaining a high voltage retention at service temperature, and has a suitably large optical anisotropy.

SUMMARY OF THE INVENTION

The first aspect of the present invention is directed to a liquid crystal composition characterized by containing as a first component, at least one compound expressed by the formula (1):

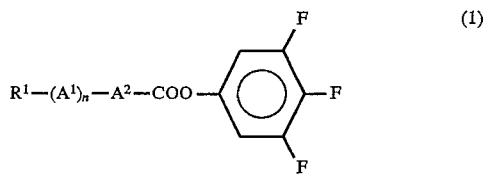

wherein $R^1$ represents an alkyl group of 1 to 10C; n represents 0 or 1; and $A^1$ and $A^2$ each independently represent trans-1,4-cyclohexylene or 1,4-phenylene, as a second component, containing at least one compound expressed by the formula (2):

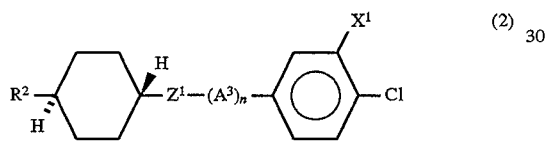

wherein $R^2$ represents an alkyl group of 1 to 10C; n represents 0 or 1; $Z^1$ represents —$C_2H_4$— or a single bond; $A^3$ represents trans-1,4-cyclohexylene or 1,4-phenylene; and $X^1$ represents H, F or Cl, as a third component, containing at least one compound chosen from among a group of compounds expressed by the formula (3):

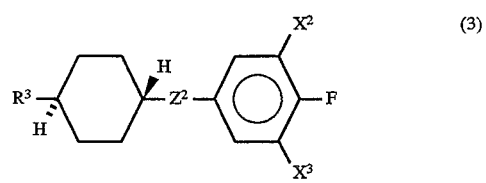

wherein $R^3$ represents an alkyl group of 1 to 10C; $Z^2$ represents —$C_2H_4$— or a single bond; and $X^2$ and $X^3$ each independently represent H or F;

the formula (4):

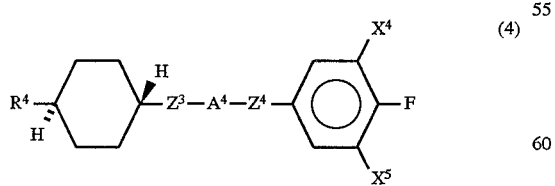

wherein $R^4$ represents an alkyl group of 1 to 10C; $Z^3$ and $Z^4$ each independently represent —$C_2H_4$— or a single bond; $A^4$ represents trans-1,4-cyclohexylene or 1,4-phenyl-ene; and $X^4$ and $X^5$ each independently represent H or F or the formula (5):

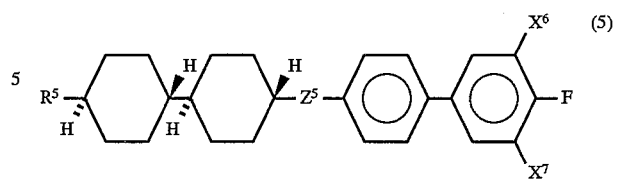

wherein $R^5$ represents an alkyl group of 1 to 10C; $Z^5$ represents —$C_2H_4$— or a single bond; and $X^6$ and $X^7$ each independently represent H or F.

A preferable embodiment in the first aspect of the present invention is directed to the above liquid crystal composition wherein the proportion of the first component in the liquid crystal composition 3 to 50% by weight, that of the second component therein is 3 to 40% by weight and that of the third component therein is 3 to 90% by weight.

The second first of the present invention is directed to the liquid crystal composition described in the first aspect of the invention, characterized by further containing as a fourth component, at least one compound chosen from among compounds expressed by the formula (6):

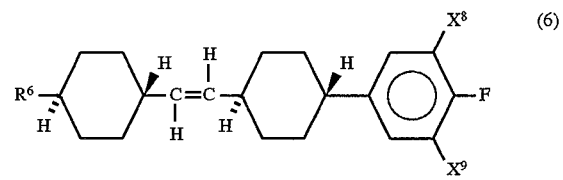

wherein $R^6$ represents an alkyl group of 1 to 10C; $X^8$ and $X^9$ each independently represent H or F, or the formula (7):

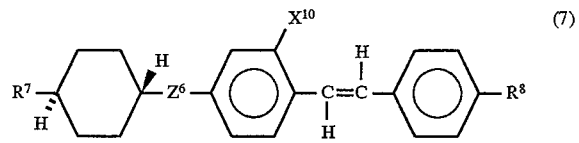

wherein $R^7$ and $R^8$ each independently represent an alkyl group of 1 to 10C; $Z^6$ represents —$C_2H_4$— or a single bond; and $X^{10}$ represents H or F.

A preferable embodiment of the second aspect of the present invention is directed to the above liquid crystal composition wherein the proportion of the fourth component therein is 3 to 50% by weight.

In the liquid crystal composition described in the first or the second aspect of the present invention, when the compound constituting the first component, expressed by the formula (1) is a compound expressed by the formula (1a):

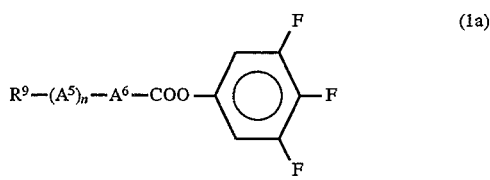

wherein $R^9$ represents a linear alkyl group of 1 to 10C; n represents 0 or 1; $A^5$ and $A^6$ each independently represent trans-1,4-cyclohexylene or 1,4-phenylene; but when $A^5$ is 1,4-phenylene, $A^6$ is 1,4-phenylene), then the liquid crystal composition is one of preferable embodiments of the present invention.

In the liquid crystal compositions described in the first and the second aspect of the present invention, when the compound constituting the second component, expressed by the formula (2) is expressed by the formula (2a), (2b) or (2c):

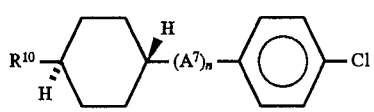
(2a)

wherein $R^{10}$ represents a linear alkyl group of 1 to 10C, n represents 0 or 1; and $A^7$ represents trans-1,4-cyclohexylene or 1,4-phenylene);

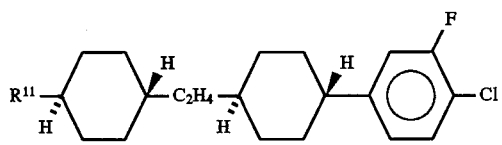
(2b)

wherein $R^{11}$ represents a linear alkyl group of 1 to 10C; or

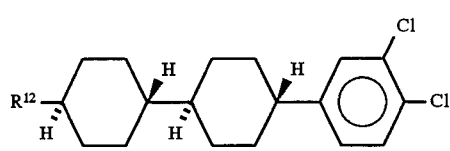
(2c)

wherein $R^{12}$ represents a linear alkyl group, then this liquid crystal composition is one of preferable embodiments of the present invention.

In the liquid crystal compositions described in the first or the second aspect of the present invention, when the compound constituting the third component, expressed by the formula (3) is a compound expressed by the formula (3a):

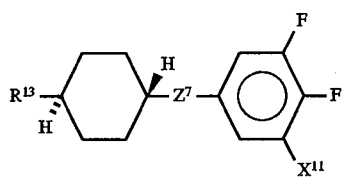
(3a)

wherein $R^{13}$ represents a linear alkyl group of 1 to 10C; $X^{11}$ represents H or F; $Z^7$ represents —$C_2H_4$— or a single bond when $X^{11}$ is F and $X^{11}$ represents a single bond when $X^{11}$ is H, then this liquid crystal composition is one of preferable embodiments of the present invention.

In the liquid crystal compositions described in the first and the second aspect of the present invention, when the compound constituting the third component, expressed by the formula (4) is a compound expressed by the formula (4a), (4b) or (4c):

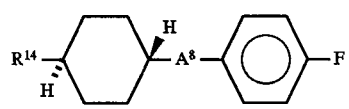
(4a)

wherein $R^{14}$ represents a linear alkyl group of 1 to 10C; and $A^8$ represents trans-1,4-cyclohexylene or 1,4-phenylen;

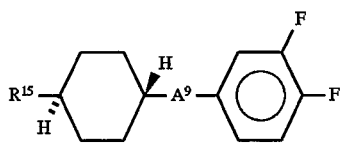
(4b)

wherein $R^{15}$ represents a linear alkyl group of 1 to 10C; and $A^9$ represents trans-1, 4-cyclohexylene, 1,4-phenylene

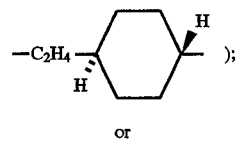

or

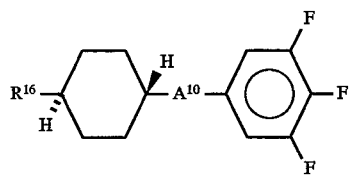
(4c)

wherein $R^{16}$ represents a linear alkyl group of 1 to 10C; and $A^{10}$ represents trans-1, 4-cyclohexylene, 1,4-pehnylene,

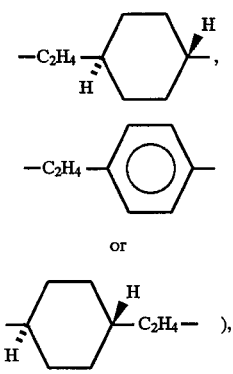

then this liquid crystal composition is one of preferable embodiments of the present invention.

In the liquid crystal compositions described in the first or the second aspect of the present invention, when the compound constituting the third component, expressed by the formula (5) is a compound expressed by the formula (5a):

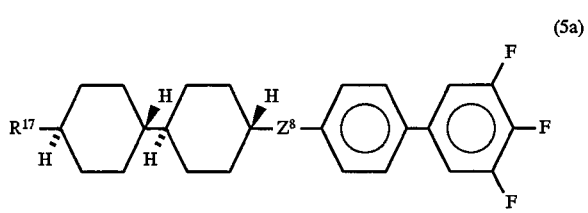
(5a)

wherein $R^{17}$ represents a linear alkyl group of 1 to 10C; and $Z^8$ represents —$C_2H_4$— or a single bond, then this liquid crystal composition is one of preferable embodiments of the present invention.

In the liquid crystal composition described in the second aspect of the present invention, when the compound constituting the fourth component, expressed by the formula (6) is a compound expressed by the formula (6a):

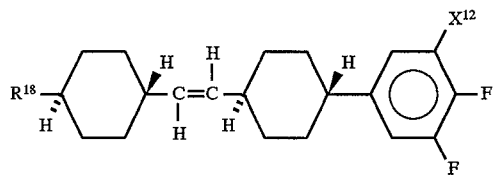

(6a)

wherein $R^{18}$ represents a linear alkyl group of 1 to 10C; and $X^{12}$ represents H or F, then the liquid crystal composition is one of preferable embodiments of the present invention.

In the liquid crystal composition described in the second aspect of the present invention, when the compound constituting the fourth component, expressed by the formula (7) is a compound expressed by the formula (7a) or (7b):

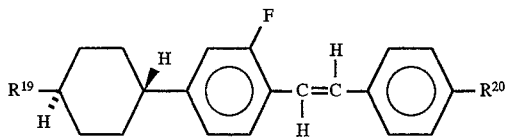

(7a)

wherein $R^{19}$ and $R^{20}$ each independently represent a linear alkyl group of 1 to 10C or.

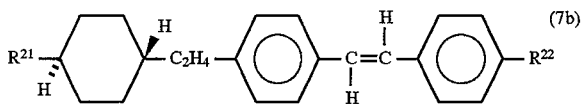

(7b)

wherein $R^{21}$ and $R^{22}$ each independently represent a linear alkyl group of 1 to 10C, then the liquid crystal composition is one of preferable embodiments of the present invention.

The third aspect of the present invention is directed to an electrooptical display element characterized by using a liquid crystal composition described any one of the first or the second aspect of the present invention.

A preferable embodiment among the third aspect of the present invention is directed to an active matrix mode liquid crystal display element characterized by using a liquid crystal composition described in any of the first or the second aspect of the present invention and having a product of the optical anisotropy (Δn) by the cell thickness (d μm) of the liquid crystal composition falling within 0.3 to 1.0.

As the compound constituting the first component, expressed by the formula (1), those expressed by the following formulas (1-1) to (1-6) are particularly preferable:

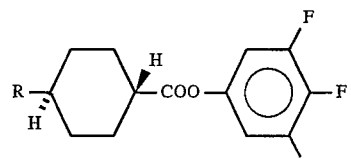

(1-1)

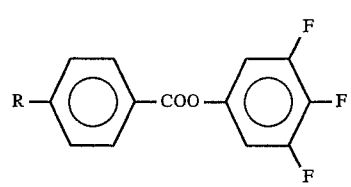

(1-2)

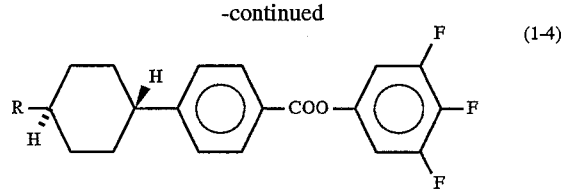

(1-4)

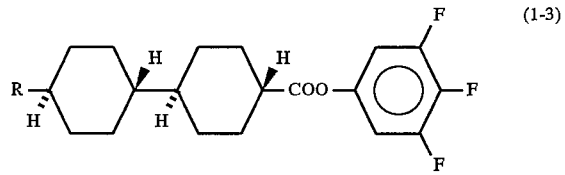

(1-3)

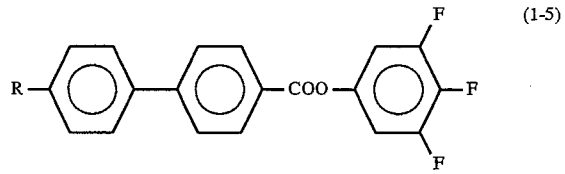

(1-5)

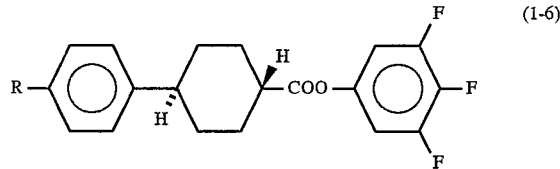

(1-6)

R in these formulas represents a linear alkyl group of 1 to 10C.

The compound expressed by the formula (1) of the present invention is particularly effective for reducing the threshold voltage, while retaining the voltage retention at service temperature.

The preferable proportion of the first component in the liquid crystal composition is within a range of 3 to 50% by weight, particularly within a range of 3 to 40% by weight.

As the compound constituting the second component of the liquid crystal composition of the present invention, expressed by the formula (2), those expressed by the following formulas (2-1) to (2-12) are particularly preferable:

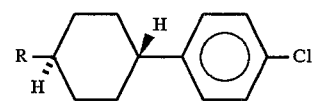

(2-1)

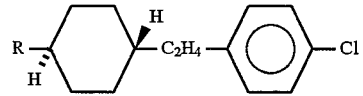

(2-2)

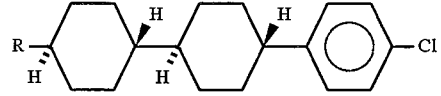

(2-3)

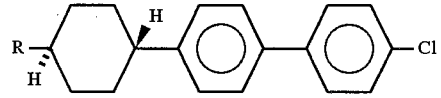

(2-4)

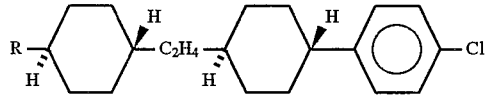

(2-5)

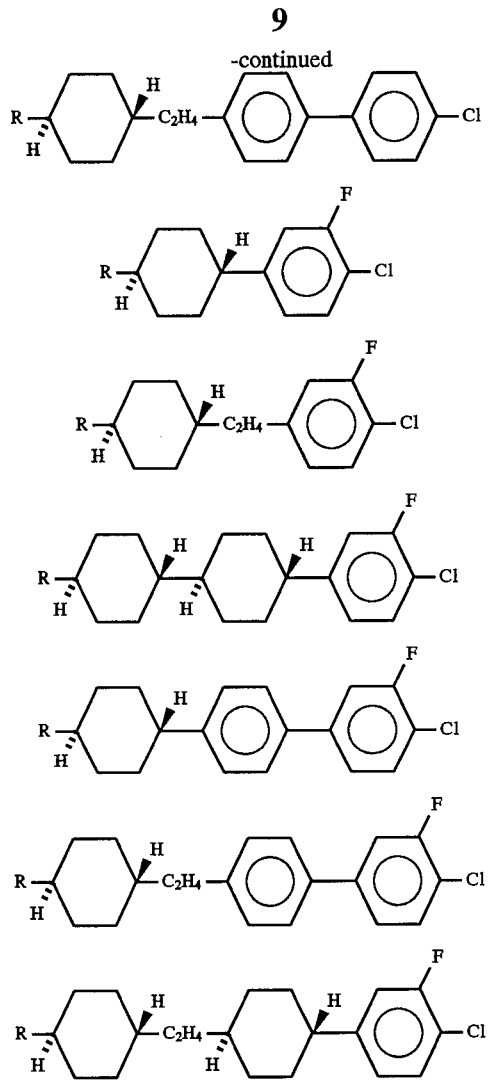

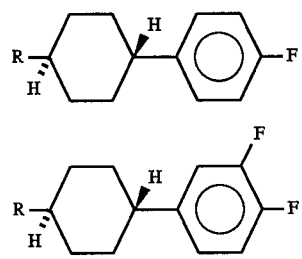

R in these formulas represent a linear alkyl group of 1 to 10C.

The compound expressed by the formula (2) of the present invention is particularly effective for increasing the optical anisotropy, while highly retaining the voltage retention at service temperature.

The preferable proportion of the second component in the liquid crystal composition of the present invention falls within a range of 3 to 40% by weight, particularly 3 to 30% by weight.

As the compound constituting the third component of the liquid crystal composition of the present invention, expressed by the formula (3), those expressed by the following formulas (3-1) to (3-6) are particularly preferable:

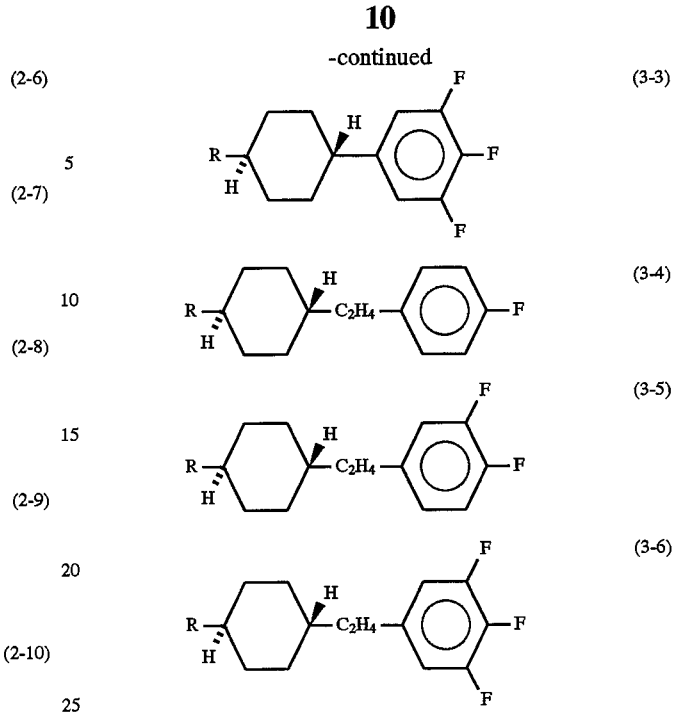

R in these formulas represents a linear alkyl group of 1 to 10C.

As the compound constituting the third component of the liquid crystal composition of the present invention, expressed by the formula (4), those expressed by the following formulas (4-1) to (4-15) are particularly preferable.

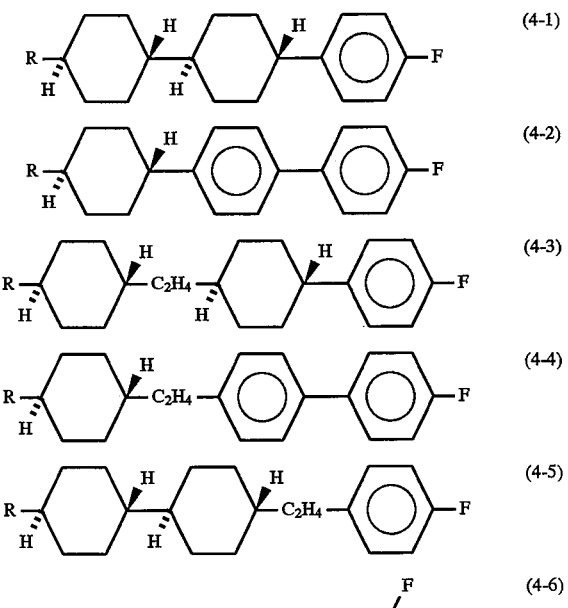

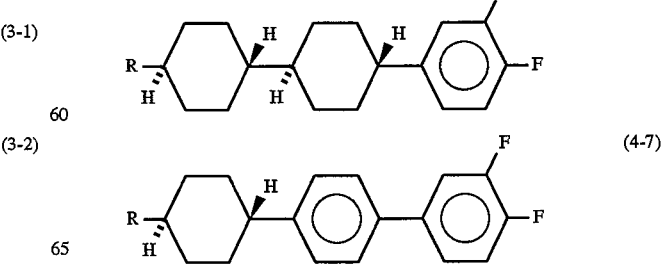

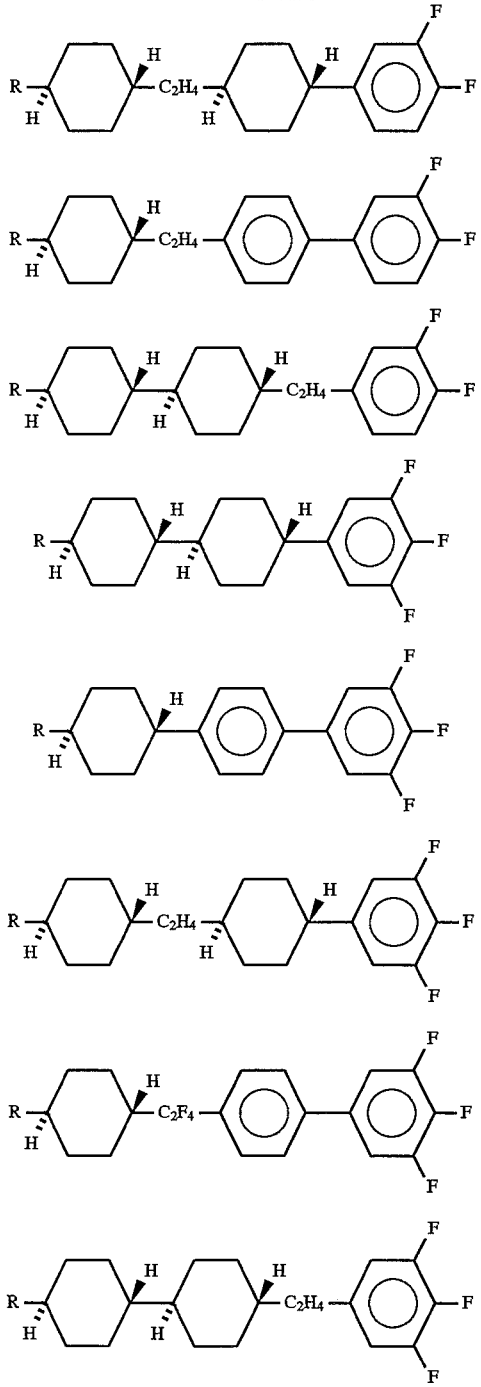

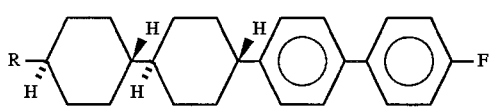

R in these formulas represent a linear alkyl group of 1 to 10C.

As a compound constituting the third component of the liquid crystal composition of the present invention, expressed by the formula (5), those expressed by the following formulas (5-1) to (5-6) are particularly preferable.

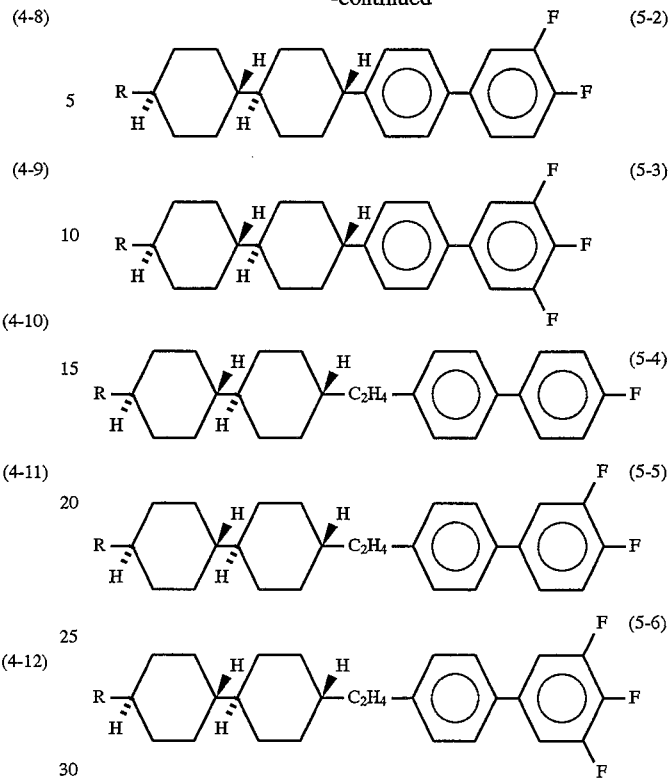

R in these formulas represents a linear alkyl group of 1 to 10C.

The compounds expressed by the formulas (3) to (5) are effective for adjusting the threshold voltage and the clearing point, while highly retaining the voltage retention at service temperature.

The preferable proportion of the third component in the liquid crystal composition falls within a range of 3 to 90% by weight, particularly 3 to 70% by weight.

As a compound constituting the fourth component of the liquid crystal composition of the present invention, expressed by the formula (6), those expressed by the following formulas (6-1) to (6-3) are particularly preferable:

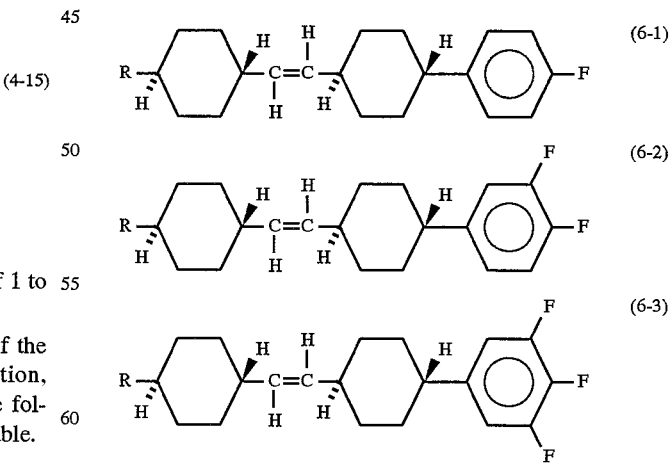

wherein R in these formulas represents a linear alkyl group of 1 to 10C.

The compound expressed by the formula (6) is effective for adjusting the viscosity, while highly retaining the voltage retention at service temperature.

As a compound constituting the fourth component of the liquid crystal composition of the present invention, expressed by the formula (7), those expressed by the following formulas are particularly preferable:

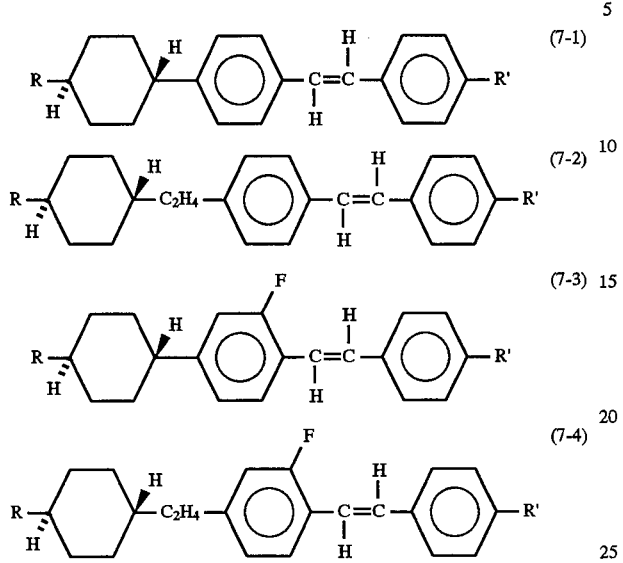

R and R' in these formulas each independently represent a linear alkyl group of 1 to 10C.

The compound expressed by the formula (7) is effective for adjusting the optical anisotropy or the clearing point, while retaining a high voltage retention at service temperature.

The preferable proportion of the fourth component in the liquid crystal composition of the present invention falls within a range of 3 to 50% by weight, particularly 3 to 40% by weight.

The liquid crystal composition of the present invention can also contain are or more other liquid crystalline compounds, besides the compounds expressed by the above formulas, in accordance with the object of the liquid crystal display element used, within a range in which the object of the present invention is not obstructed.

As preferable examples of these compounds, compounds expressed by the following formulas (8) to (17) are mentioned:

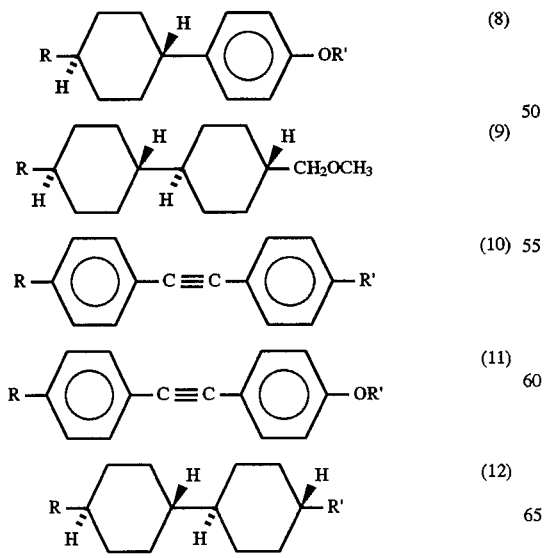

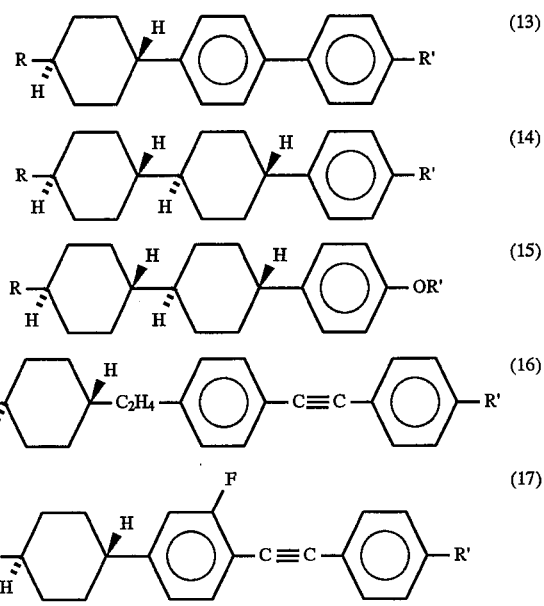

R and R' in these formulas each independently represent a linear alkyl group of 1 to 10C.

Next, particularly preferable embodiments of the present invention will be concretely shown.

A liquid crystal composition characterized by containing 3 to 40% by weight of a first component containing at least one compound chosen from among a group of compounds expressed by the above formula (1a);

3 to 30% by weight of a second component containing at least one compound chosen from among a group of compounds expressed by the above formula (2a); and 3 to 70% by weight of a third component containing at least one compound chosen from among a group of compounds expressed by the above formula (4b) and at least one compound chosen from among a group of compounds expressed by the above formula (4c).

A liquid crystal composition characterized by containing 3 to 40% by weight of a first component containing at least one compound chosen from among a group of compounds expressed by the above formula (1a);

3 to 30% by weight of a second component containing at least one compound chosen from among a group of compounds expressed by the above formula (2a); and 3 to 70% by weight of a third component containing at least one compound chosen from among a group of compounds expressed by the above formula (3a), and at least one compound chosen from among a group of compounds expressed by the above formula (4c).

A liquid crystal composition characterized by containing 3 to 40% by weight of a first component containing at least one compound chosen from among a group of compounds expressed by the above formula (1a);

3 to 30% by weight of a second component containing at least one compound chosen from among a group of compounds expressed by the above formula (2a); and 3 to 70% by weight of a third component containing at least one compound chosen from a group of compounds expressed by the above formula (4a), at least one compound chosen from among a group of compounds expressed by the above formula (4b), and at least one compound chosen from among a group of compounds expressed by the above formula (4c).

A liquid crystal composition characterized by containing 3 to 40% by weight of a first component containing at least one compound chosen from among a group of compounds expressed by the above formula (1a);

3 to 30% by weight of a second component containing at least one compound chosen from among a group of compounds expressed by the above formula (2a), at least one compound chosen from among a group of compounds expressed by the above formula (2b), and at least one compound chosen from a group of compounds expressed by the above formula (2c); and 3 to 70% by weight of a third component containing at least one compound chosen from among a group of compounds expressed by the above formula (3a) and at least one compound chosen from a group of compounds expressed by the above formula (4c).

A liquid crystal composition characterized by containing 3 to 40% by weight of a first component containing at least one compound chosen from a group of compounds expressed by the above formula (1a);

3 to 30% by weight of a second component containing at least one compound chosen from among a group of compounds expressed by the above formula (2a); and 3 to 70% by weight of a third component containing at least one compound chosen from among a group of compounds expressed by the above formula (3a), at least one compound chosen from a group of compounds expressed by the above formula (4b), and at least one compound chosen from a group of compounds expressed by the formula (4c).

A liquid crystal composition characterized by containing 3 to 40% by weight of a first component containing at least one compound chosen from among a group of compounds expressed by the above formula (1a);

3 to 30% by weight of a second component containing at least one compound chosen from among a group of compounds expressed by the above formula (2a); and 3 to 70% by weight of a third component containing at least one compound chosen from among a group of compounds expressed by the above formula (4c), and at least one compound chosen from among a group of compounds expressed by the above formula (5a).

A liquid crystal composition characterized by containing 3 to 40% by weight of a first component containing at least one compound chosen from among a group of compounds expressed by the above formula (1a);

3 to 30% by weight of a second component containing at least one compound chosen from among a group of compound expressed by the above formula (2a);

3 to 70% by weight of a third component containing at least one compound chosen from among a group of compounds expressed by the above formula (4c); and 3 to 40% by weight of a fourth component containing at least one compound chosen from among a group of compounds expressed by the above formula (6a), at least one compound chosen from among a group of compounds expressed by the above formula (7a), and at least one compound chosen from among a group of compounds expressed by the above formula (7b).

Further, preferable embodiments of the second component constituting the liquid crystal composition of the present invention are as follows:

A case where the component consists of at least one compound chosen from among a group of compounds expressed by the above formula (2a).

A case where the component consists of at least one compound chosen from among a group of compounds expressed by the above formula (2b).

A case where the component consists of at least one compound chosen from among a group of compounds expressed by the above formula (2c).

A case where the component consists of at least one compound chosen from among a group of compounds expressed by the above formula (2a) and at least one compound chosen from among a group of compounds expressed by the above formula (2b).

A case where the component consists of at least one compound chosen from among a group of compounds expressed by the above formula (2a), and at least one compound chosen from among a group of compounds expressed by the above formula (2c).

A case where the component consists of at least one compound chosen from among a group of compounds expressed by the above formula (2b), and at least one compound chosen from among a group of compounds expressed by the above formula (2c).

A case where the component consists of at least one compound chosen from among a group of compounds expressed by the above formula (2a), at least one compound chosen from among a group of compounds expressed by the above formula (2b) and at least one compound chosen from among a group of compounds expressed by the above formula (2c).

Further, preferable embodiments of the third component constituting the liquid crystal composition of the present invention are as follows:

A case where the component consists of at least one compound chosen from among a group of compounds expressed by the above formula (3a).

A case where the component consists of at least one compound chosen from among a group of compounds expressed by the above formula (4a).

A case where the component consists of at least one compound chosen from among a group of compounds expressed by the above formula (4b).

A case where the component consists of at least one compound chosen from among a group of compound expressed by the above formula (4c).

A case where the component consists of at least one compound chosen from among a group of compounds expressed by the above formula (5a).

A case where the component consists of at least one compound chosen from among a group of compounds expressed by the above formula (3a) and at least one compound chosen from among a group of compounds expressed by the above formula (4a).

A case where the component consists of at least one compound chosen from a group of compounds expressed by the above formula (3a) and at least one compound chosen from among a group of compounds expressed by the above formula (4b).

A case where the component consists of at least one compound chosen from among a group of compounds expressed by the above formula (3a), and at least one compound chosen from a group of compounds expressed by the above formula (4c).

A case where the component consists of at least one compound chosen from among a group of compounds expressed by the above formula (3a), and at least one compound chosen from among a group of compounds expressed by the above formula (5a).

A case where the component consists of at least one compound chosen from among a group of compounds expressed by the above formula (4a), and at least one compound chosen from among a group of compounds expressed by the above formula (4b).

A case where the component consists of at least one compound chosen from a group of compounds expressed by the above formula (4a), and at least one compound chosen from among a group of compounds expressed by the above formula (4c).

A case where the component consists of at least one compound chosen from among a group of compounds expressed by the above formula (4a), and at least one compound chosen from a group of compounds expressed by the above formula (5a).

A case where the component consists of at least one compound chosen from among a group of compounds expressed by the above formula (4b), and at least one compound chosen from a group of compounds expressed by the above formula (4c).

A case where the component consists of at least one compound chosen from a group of compounds expressed by the above formula (4b), and at least one compound chosen from a group of compounds expressed by the above formula (5a).

A case where the component consists of at least one compound chosen from among a group of compounds expressed by the above formula (4c), and at least one compound chosen from among a group of compounds expressed by the above formula (5a).

A case where the component consists of at least one compound chosen from among a group of compounds expressed by the above formula (3a), at least one compound chosen from a group of compounds expressed by the above formula (4a), and at least one compound chosen from a group of compounds expressed by the formula (4b).

A case where the component consists of at least one compound chosen from a group of compounds expressed by the above formula (3a), at least one compound chosen from a group of compounds expressed by the above formula (4a), and at least one compound chosen from among a group of compounds expressed by the above formula (4c).

A case where the component consists of at least one compound chosen from among a group of compounds expressed by the above formula (3a), at least one compound chosen from among a group of compounds expressed by the formula (4a), and at least one compound chosen from among a group of compounds expressed by the above formula (5a).

A case where the component consists of at least one compound chosen from among a group of compounds expressed by the above formula (3a), at least one compound chosen from among a group of compounds expressed by the above formula (4b), and at least one compound chosen from among a group of compounds expressed by the above formula (4c).

A case where the component consists of at least one compound chosen from among a group of compounds expressed by the above formula (3a), at least one compound chosen from among a group of compounds expressed by the above formula (4b), and at least one compound chosen from among a group of compounds expressed by the above formula (5a).

A case where the component consists of at least one compound chosen from among a group of compound expressed by the above formula (3a), at least one compound chosen from among a group of compounds expressed by the above formula (4c), and at least one compound chosen from a group of compounds expressed by the above formula (5a).

A case where the component consists of at least one compound chosen from among a group of compounds expressed. by the above formula (4a), at least one compound chosen from among a group of compounds expressed by the above formula (4b), and at least one compound chosen from among a group of compounds expressed by the above formula (4c).

A case where the component consists of at least one compound chosen from among a group of compounds expressed by the above formula (4a), at least one compound chosen from among a group of compounds expressed by the above formula (4b), and at least one compound chosen from among a group of compounds expressed by the above formula (5a).

A case where the component consists of at least one compound chosen from among a group of compounds expressed by the above formula (4a), at least one compound chosen from among a group of compounds expressed by the above formula (4c), and at least one compound chosen from among a group of compounds expressed by the above formula (5a).

A case where the composition consists of at least one compound chosen from among a group of compounds expressed by the above formula (4b), at least one compound chosen from among a group of compounds expressed by the above formula (4c), and at least one compound chosen from among a group of compounds expressed by the above formula (5a).

A case where the component consists of at least one compound chosen from among a group of compounds expressed by the above formula (3a), at least one compound chosen from among a group of compounds expressed by the above formula (4a), at least one compound chosen from among a group of compounds expressed by the above formula (4b), and at least one compound chosen from among a group of compounds expressed by the above formula (5a).

A case where the component consists of at least one compound chosen from among. a group of compounds expressed by the above formula (3a), at least one compound chosen from among a group of compounds expressed by the above formula (4a), at least one compound chosen from among a group of compounds expressed by the above formula (4c), and at least one compound chosen from among a group of compounds expressed by the above formula (5a).

A case where the component consists of at least one compound chosen from a group of compounds expressed by the above formula (3a), at least one compound chosen from a group of compounds expressed by the formula (4a), at least one compound chosen from among a group of compounds expressed by the above formula (4c), and at least one compound chosen from among a group of compounds expressed by the above formula (5a).

A case where the component consists of at least one compound chosen from among a group of compounds expressed by the above formula (4a), at least one compound chosen from among a group of compounds expressed by the above formula (4b), at least one compound chosen from a group of compounds expressed by the above formula (4c), and at least one compound chosen from among a group of compounds expressed by the above formula (5a).

A case where the component consists of at least one compound chosen from among a group of compounds expressed by the formula (3a), at least one compound chosen from among a group of compounds expressed by the above formula (4a), at least one compound chosen from among a group of compounds expressed by the above formula (4b), at least one compound chosen from among a group of compounds expressed by the above formula (4c), and at least one compound chosen from a group of compounds expressed by the above formula (5a).

To the liquid crystal composition of the present invention may be added a chiral agent in order to induce the helical structure of liquid crystal, adjust a necessary twist angle and prevent the reverse twist. The liquid crystal composition of the present invention is adjusted according to a method of dissolving various components with each other at a high temperature.

Further, to the liquid crystal composition of the present invention may also be added a dichroic dyestuff such as those of mellocyanine group, styryl group, azo group, azomethine group, azoxy group, quinophthalone group, anthraquinone group, tetrazine group, etc. to prepare a liquid crystal composition for guest-host (GH) mode. Further, the liquid crystal composition may be also used as a polymer dispersion type display element (PDLCD) represented by NCAP prepared by microcapsulating nematic liquid crystal or polymer network liquid crystal display element (PNLCD) obtained by forming a three-dimensional reticular high molecule in liquid crystal. Besides, the liquid crystal composition is also usable as those of birefingence-control (ECB) mode or dynamic scattering (DS) mode.

EXAMPLE

Next, the present invention will be described in more detail by way of Examples and Comparative examples, but it should not be construed to be limited thereto.

In Comparative examples and Examples, the measured temperature of threshold voltage refers to 25.0° C., the measured temperature of viscosity refers to 20.0° C., the measured temperature of optical anisotropy refers to 25.0° C., and the measured wavelength of optical anisotropy refers to 589 μm. Further, the composition ratios (%) in Comparative examples and Examples, all refer to % by weight. The voltage retention was calculated according to the method described in WO94/03558. The specific resistance value was measured according to the method disclosed in Japanese patent application laid-open No. Hei 2-289682, that is, the initial value (before heating) was measured at 25.0° C., followed by heating at 80° C. for 100 hours and then measuring at 25.0° C. In addition, the specific resistance value of the initial value is expressed by ρo and the specific resistance value after heating is expressed by ρH.

Comparative example 1

A liquid crystal composition composed of compounds having CN group at its terminal and expressed by the following composition was prepared:

| | |
|---|---|
| 4-(trans-4-propylcyclohexyl)benzonitrile | 24% |
| 4-(trans-4-pentylcyclohexyl)benzonitrile | 36% |
| 4-(trans-4-heptylcyclohexyl)benzonitrile | 25% |
| 4-[4-(trans-4-pentylcyclohexyl)phenyl)benzonitrile | 15%. |

This liquid crystal composition exhibited a clearing point of 72.4° C., a viscosity of 27.0 mPa.s, an optical anisotropy of 0.137, a threshold voltage of 1.78 V, a voltage retention at 25.0° C. of 94.9% and a voltage retention at 70.0° C. of 42.8%. Further, ρo was $5.0 \times 10^{11}$ Ω.cm, and ρH was $2.0 \times 10^{10}$ Ω.cm.

Comparative example 2

The following liquid crystal composition disclosed in Japanese patent application laid-open No. Hei 2-289682 was prepared:

| | |
|---|---|
| 1-[trans-4-(trans-4-ethylcyclohexyl)cyclohexyl]-2-(3,4-difluorophenyl)ethane | 28% |
| 1-[trans-4-(trans-4-butylcyclohexyl)cyclohexyl]-2-(3,4-difluorophenyl)ethane | 6% |
| 1-[trans-4-(trans-4-pentylcyclohexyl)cyclohexyl]-2-(3,4-difluorophenyl)ethane | 6% |
| 1-(trans-4-ethylcyclohexyl)-2-[trans-4-(3,4-difluorophenyl)cyclohexyl]ethane | 22% |
| 1-(trans-4-propylcyclohexyl)-2-[trans-4-(3,4-difluorophenyl)cyclohexyl]ethane | 8.4% |
| 1-(trans-4-butylcyclohexyl)-2-[trans-4-(3,4-difluorophenyl)cyclohexyl]ethane | 9.6% |
| 1-(trans-4-ethylcyclohexyl)-2-(3,4-difluorophenyl)ethane | 10% |
| 1-(trans-4-pentylcyclohexyl)-2-(3,4-diluforophenyl)ethane | 10% |

This composition exhibited a clearing point of 78.8° C., a viscosity of 26.0 mPa.s, an optical anisotropy of 0.081, a threshold voltage of 1.95 V, a voltage retention at 25.0° C. of 98.5% and a voltage retention at 70.0° C. of 98.2%. Further, ρo was $1.6 \times 10^{14}$ Ω.cm and ρH was $4.1 \times 10^{12}$ Ω.cm.

Comparative example 3

The following liquid crystal composition disclosed in WO94/03558 was prepared:

| | |
|---|---|
| 5-[trans-4-(trans-4-ethylcyclohexyl)cyclohexyl]-1,2,3-trifluorobenzene | 26% |
| 5-[trans-4-(trans-4-propylcyclohexyl)cyclohexyl]-1,2,3-trifluorobenzene | 26% |
| 5-[trans-4-(trans-4-pentylcyclohexyl)cyclohexyl]-1,2,3-trifluorobenzene | 26% |
| 4-(trans-4-heptylcyclohexyl)-1,2-difluorobenzene | 12% |
| 1-(trans-4-pentylcyclohexyl)-2-(3,4-difluorophenyl)ethane | 10% |

This composition exhibited a clearing point of 46.0° C., a viscosity of 21.6 mPa.s, an optical anisotropy of 0.058, a threshold voltage of 1.17 V, a voltage retention at 25.0° C. of 98.5% and a voltage retention at 70.0° C. of 98.3%. Further, ρo was $2.1 \times 10^{14}$ Ω.cm and ρH was $6.7 \times 10^{12}$ Ω.cm.

EXAMPLE 1

A liquid crystal composition expressed by the following composition was prepared:

| | |
|---|---|
| as compounds expressed by the formula (1), | |
| 3,4,5-trifluorophenyl-trans-4-(trans-4-pentylcyclohexyl)cyclohexanecarboxylate | 5% |
| 3,4,5-trifluorophenyl-4-(trans-4-ethylcyclohexyl)benzoate | 5% |
| 3,4,5-trifluorophenyl-4-(trans-4-propylcyclohexyl)benzoate | 5% |
| 3,4,5-trifluorophenyl-4-(trans-4-pentylcyclohexyl)benzoate | 5%, |
| as compounds expressed by the formula (2), | |
| 4-[trans-4-(trans-4-ethylcyclohexyl)cyclohexyl]-1-chlorobenzene | 6% |
| 4-[trans-4-(trans-4-butylcyclohexyl)cyclohexyl]-1-chlorobenzene | 10% |
| 4-[trans-4-(trans-4-pentylcyclohexyl)cyclohexyl]-1-chlorobenzene | 6%, |
| and as compounds expressed by the formula (4), | |
| 4'-(4-propylcyclohexyl)-3,4,5-trifluorobiphenyl | 15% |
| 4'-(4-pentylcyclohexyl)-3,4,5-trifluorobiphenyl | 15% |

-continued

| | |
|---|---|
| 4'-(4-ethylcyclohexyl)-3,4-difluorobiphenyl | 7% |
| 4'-(4-propylcyclohexyl)-3,4-difluorobiphenyl | 7% |
| 4'-(4-pentylcyclohexyl)-3,4-difluorobiphenyl | 14% |

This composition exhibited a clearing point of 101.1° C., a viscosity of 33.1 mPa.s, an optical anisotropy of 0.127, a threshold voltage of 1.68 V, a voltage retention at 25.0° C. of 98.3% and a voltage retention at 70.0° C. of 98.0%. Further, ρo was $1.7 \times 10^{14}$ Ω.cm and ρH was $6.6 \times 10^{12}$ Ω.cm. The specific resistance and voltage retention were higher than those of Comparative example 1; the threshold voltage were lower than that of Comparative example 2; and the optical anisotropy was greater than that of Comparative example 3.

EXAMPLE 2

A liquid crystal composition expressed by the following composition was prepared:

| | |
|---|---|
| as compounds expressed by the formula (1), | |
| 3,4,5-trifluorophenyl-trans-4-(trans-4-pentylcyclo-hexyl)cyclohexanecarboxylate | 5% |
| 3,4,5-trifluorophenyl-4-(trans-4-ethylcyclohexyl)-benzoate | 5% |
| 3,4,5-trifluorophenyl-4-(trans-4-propylcyclohexyl)-benzoate | 5% |
| 3,4,5-trifluorophenyl-4-(trans-4-pentylcyclohexyl)-benzoate | 5% |
| 3,4,5-trifluorophenyl-4'-propylbiphenyl-4-carboxylate | 5% |
| 3,4,5-trifluorophenyl-4'-butylbiphenyl-4-carboxylate | 5% |
| 3,4,5-trifluorophenyl-4'-pentylbiphenyl-4-carboxylate | 5% |
| 3,4,5-trifluorophenyl-trans-4-butylcyclohexane-carboxylate | 10%, |
| As a compound expressed by the formula (2), | |
| 4-[trans-4-(trans-4-butylcyclohexyl)cyclcohexyl]-1-chlorobenzene | 10%, |
| as compounds expressed by the formula (3), | |
| 4-(trans-4-heptylcyclohexyl)-1,2-difluorobenzene | 3% |
| 5-(trans-4-heptylcyclohexyl)-1,2,3-trifluorobenzene | 9%, |
| and as compounds expressed by the formula (4), | |
| 4'-(trans-4-propylcyclohexyl)-3,4,5-trifluorobiphenyl | 10% |
| 5-[trans-4-(trans-4-pentylcyclohexyl)cyclohexyl]-1,2,3-trifluorobenzene | 10% |
| 1-(trans-4-propylcyclohexyl)-2-(3,4,5-trifluoro-biphenyl-4'-yl)ethane | 13%. |

This composition exhibited a clearing point of 46.1° C., a viscosity of 36.3 mPa.s, an optical anisotropy of 0.096, a threshold voltage of 0.91 V, a voltage retention at 25.0° C. of 98.3% and a voltage retention at 70.0° C. of 97.8%. Further ρo was $2.0 \times 10^{14}$ Ω.cm and ρH was $4.0 \times 10^{12}$ Ω.cm. The specific resistance and the voltage retention were higher than those of Comparative example 1, the threshold voltage was lower than that of Comparative example 2 and the optical anisotropy was greater than that of Comparative example 3.

EXAMPLE 3

A liquid crystal composition expressed by the following composition was prepared:

| | |
|---|---|
| as compounds expressed by the formula (1), | |
| 3,4,5-trifluorophenyl-4-ethylbenzoate | 10% |
| 3,4,5-trifluorophenyl-4-(trans-4-ethylcyclohexyl)-benzoate | 5% |
| 3,4,5-trifluorophenyl-4-(trans-4-propylcyclohexyl)-benzoate | 5% |
| 3,4,5-trifluorophenyl-4'-propylbiphenyl-4-carboxylate | 5% |
| as compounds expressed by the formula (2), | |
| 4-(trans-4-propylcyclohexyl)-1-chlorobenzene | 5% |
| 4-[trans-4-(trans-4-butylcyclohexyl)cyclohexyl]-1-chlorobenzene | 10% |
| 4-[trans-4-(trans-4-pentylcyclohexyl)cyclohexyl]-1-chlorobenzene | 5%, |
| and as compounds expressed by the formula (4), | |
| 1-(trans-4-propylcyclohexyl)-2-(3,4,5-trifluorobiphenyl)-4'-yl)ethane | 10% |
| 1-(trans-4-butylcyclohexyl)-2-(3,4,5-trifluorobiphenyl)-4'-yl)ethane | 10% |
| 1-(trans-4-pentylcyclohexyl)-2-(3,4,5-trifluoro-biphenyl-4'-yl)ethane | 13% |
| 4'-(trans-4-propylcyclohexyl)-4-fluorobiphenyl | 3% |
| 4-[trans-4-(trans-4-propylcyclohexyl)cyclohexyl]-1-fluorobenzene | 3% |
| 4'-(trans-4-ethylcyclohexyl)-3,4-difluorobiphenyl | 4% |
| 4'-(trans-4-propylcyclohexyl)-3,4-difluorobiphenyl | 4% |
| 4'-(trans-4-pentylcyclohexyl)-3,4-difluorobiphenyl | 8% |

This composition exhibited a clearing point of 71.1° C., a viscosity of 27.7 mPa.s, an optical anisotropy of 0.121, a threshold voltage of 1.33 V, a voltage retention at 25.0° C. of 98.3% and a voltage retention at 70.0° C. of 98.3%. Further, ρo was $1.8 \times 10^{14}$ Ω.cm and ρH was $5.1 \times 10^{12}$ Ω.cm. The specific resistance and the voltage retention were higher than those of Comparative example 1, the threshold voltage was lower than that of Comparative example 2 and the optical anisotropy was greater than that of Comparative example 3.

EXAMPLE 4

A liquid crystal composition expressed by the following composition was prepared:

| | |
|---|---|
| as compounds expressed by the formula (1), | |
| 3,4,5-trifluorophenyl-trans-4-ethylcyclohexane-carboxylate | 10% |
| 3,4,5-trifluorophenyl-trans-4-(trans-4-pentylcyclo-hexyl)cyclohexanecarboxylate | 5% |
| 3,4,5-trifluorophenyl-4'-propylbiphenyl-4-carboxylate | 5% |
| 3,4,5-trifluorophenyl-4'-butylbiphenyl-4-carboxylate | 5%, |
| as compounds expressed by the formula (2), | |
| 4-[trans-4-(trans-(trans-4-ethylcyclohexyl)cyclohexyl]-1,2-dichlorobenzene | 3% |
| 1-(trans-4-ethylcyclohexyl)-2-[trans-4-(3-fluoro-4-chlorophenyl)cyclohexyl]ethane | 5% |
| 4-[trans-4-(trans-4-butylcyclohexyl)cyclohexyl]-1-chlorobenzene | 10% |
| 4'-(trans-4-ethylcyclohexyl)-4-chlorobiphenyl | 3%, |
| as compounds expressed by the formula (3), | |
| 4-(trans-4-heptylcyclohexyl)-1,2-difluorobenzene | 5% |
| 5-(trans-4-heptylcyclohexyl)-1,2,3-trifluorobenzene | 5% |
| as compounds expressed by the formula (4), | |
| 4'-(trans-4-propylcyclohexyl)-3,4,5-trifluorobiphenyl | 15% |
| 4'-(trans-4-pentylcyclohexyl)-3,4,5-trifluorobiphenyl | 15% |
| 1-(trans-4-propylcyclohexyl)-2-(3,4,5-trifluoro-biphenyl-4'-yl)ethane | 5% |
| 1-(trans-4-butylcyclohexyl)-2-(3,4,5-trifluoro- | 5% |

| biphenyl-4'-yl)ethane | |
| --- | --- |
| 1-(trans-4-pentylcyclohexyl)-2-(3,4,5-trifluoro-biphenyl-4'-yl)ethane | 4% |

This composition exhibited a clearing point of 48.6° C., a viscosity of 30.1 mPa.s, an optical anisotropy of 0.096, a threshold voltage of 1.12 V, a voltage retention at 25.0° C. of 98.4% and a voltage retention at 70.0° C. of 97.9%. Further, ρo was $2.2 \times 10^{14}$ Ω.cm and ρH was $3.9 \times 10^{12}$ Ω.cm.

EXAMPLE 5

A liquid crystal composition expressed by the following composition was prepared:

| as compounds expressed by the formula (1), | |
| --- | --- |
| 3,4,5-trifluorophenyl-4-(trans-4-ethylcyclohexyl)-benzoate | 5% |
| 3,4,5-trifluorophenyl-trans-4-(trans-4-pentylcyclo-hexyl)cyclohexanecarboxylate | 5% |
| 3,4,5-trifluorophenyl-4'-propylbiphenyl-4-carboxylate | 5%, |
| as compounds expressed by the formula (2), | |
| 4-[trans-4-(trans-4-ethylcyclohexyl)cyclohexyl]-1-chlorobenzene | 5% |
| 4-[trans-4-(trans-4-butylcyclohexyl)cyclohexyl]-1-chlorobenzene | 10% |
| 4-[trans-4-(trans-4-pentylcyclohexyl)cyclohexyl]-1-chlorobenzene | 5% |
| as a compound expressed by the formula (3), | |
| 1-(trans-4-pentylcyclohexyl)-2-(3,4-difluorophenyl)-ethane | 5% |
| as compounds expressed by the formula (4), | |
| 4-[trans-4-(trans-4-propylcyclohexyl)cyclohexyl]-1,2-difluorobenzene | 5% |
| 1-(trans-4-propylcyclohexyl)-2-[trans-4-(3,4-difluorophenyl)cyclohexyl]ethane | 5% |
| 5-[trans-4-(trans-4-propylcyclohexyl)cyclohexyl]-1,2,3-trifluorobenzene | 5% |
| 1-(trans-4-propylcyclohexyl)-2-[trans-4-(3,4,5-trifluorophenyl)cyclohexyl]ethane | 5% |
| 1-(trans-4-propylcyclohexyl)-2-(3,4,5-trifluoro-biphenyl-4'-yl)ethane | 10% |
| 1-(trans-4-butylcyclohexyl)-2-(3,4,5-trifluoro-biphenyl-4'-yl)ethane | 10% |
| 1-(trans-4-pentylcyclohexyl)-2-(3,4,5-trifluoro-biphenyl-4'-yl)ethane | 10% |
| 4'-(trans-4-propylcyclohexyl)-3,4,5-trifluorobiphenyl | 10%. |

This composition exhibited a clearing point of 89.5° C., a viscosity of 27.8 mPa.s, an optical anisotropy of 0.111, a threshold voltage of 1.66 V, a voltage retention at 25.0° C. of 98.4% and a voltage retention at 70° C. of 97.8%. Further, ρo was $1.8 \times 10^{14}$ Ω.cm and ρH was $3 \times 10^{12}$ Ω.cm.

EXAMPLE 6

A liquid crystal composition expressed by the following composition was prepared:

| as compounds expressed by the formula (1), | |
| --- | --- |
| 3,4,5-trifluorophenyl-4-(trans-ethylcyclohexyl)-benzoate | 5% |
| 3,4,5-trifluorophenyl-4-(trans-4-propylcyclohexyl)-benzoate | 5% |
| 3,4,5-trifluorophenyl-4-(trans-4-pentylcyclohexyl)-benzoate | 5% |
| 3,4,5-trifluorophenyl-4'-(propylbiphenyl-4-carboxylate | 5%, |
| as compounds expressed by the formula (2), | |
| 4-[trans-4-(trans-4-ethylcyclohexyl)cyclohexyl]-1-chlorobenzene | 5% |
| 4-[trans-4-(trans-4-butylcyclohexyl)cyclohexyl]-1-chlorobenzene | 10% |
| 4-[trans-4-(trans-4-pentylcyclohexyl)cyclohexyl]-1-chlorobenzene | 5%, |
| as compounds expressed by the formula (4), | |
| 1-(trans-4-propylcyclohexyl)-2-(3,4,5-trifluoro-biphenyl-4'-yl)ethane | 10% |
| 1-(trans-4-pentylcyclohexyl)-2-(3,4,5-trifluoro-biphenyl-4'-yl)ethane | 10%, |
| 4'-(trans-4-propylcyclohexyl)-3,4,5-trifluorobiphenyl | 10%, |
| 4'-(trans-4-pentylcyclohexyl)-3,4,5-trifluorobiphenyl | 10%, |
| 1-[trans-4-(trans-4-propylcyclohexyl)cyclohexyl]-2-(3,4,5-trifluorophenyl)ethane | 5%, |
| and as compounds expressed by the formula (5), | |
| 4'-[trans-4-(trans-4-ethylcyclohexyl)cyclohexyl]-3,4,5-trifluorobiphenyl | 5%, |
| 1-[trans-4-(trans-4-propylcyclohexyl)cyclohexyl]-2-(3,4,5-trifluorobiphenyl-4'-yl)ethane | 5%, |
| 1-[trans-4-(trans-4-butylcyclohexyl)cyclohexyl]-2-(3,4,5-trifluorobiphenyl-4'-yl)ethane. | 5% |

This composition exhibited a clearing point of 113.6° C., a viscosity of 38.3 mPa.s, an optical anisotropy of 0.133, a threshold voltage of 1.64 V, a voltage retention at 25.0° C. of 98.3% and a voltage retention at 70.0° C. of 97.8%. Further, ρo was $1.6 \times 10^{14}$ Ω.cm and ρH was $6.7 \times 10^{12}$ Ω.cm.

EXAMPLE 7

A liquid crystal composition expressed by the following composition was prepared:

| as compounds expressed by the formula (1), | |
| --- | --- |
| 3,4,5-trifluorophenyl-4-(trans-4-ethylcyclohexyl)-benzoate | 5%, |
| 3,4,5-trifluorophenyl-trans-4-(trans-4-pentylcyclo-hexyl)cyclohexanecarboxylate | 5%, |
| 3,4,5-trifluorophenyl-4'-propylbiphenyl-4-carboxylate | 5%, |
| as a compound expressed by the formula (2), | |
| 4-[trans-4-(trans-4-butylcyclohexyl)cyclohexyl]-1-chlorobenzene | 10%, |
| as compounds expressed by the formula (4), | |
| 4'-(trans-4-propylcyclohexyl)-3,4,5-trifluorobiphenyl | 10%, |
| 4'-(trans-4-pentylcyclohexyl)-3,4,5-trifluorobiphenyl | 10%, |
| 1-(trans-4-propylcyclohexyl)-2-(3,4,5-trifluoro-biphenyl-4'-yl)ethane | 10% |
| 1-(trans-4-butylcyclohexyl)-2-(3,4,5-trifluoro-biphenyl-4'-yl)ethane | 10%, |
| 1-(trans-4-pentylcyclohexyl)-2-(3,4,5-trifluoro-biphenyl-4'-yl)ethane | 10%, |
| as compounds expressed by the formula (6), | |
| trans-1-(trans-4-propylcyclohexyl)-2-[trans-4-(3,4-difluorophenyl)cyclohexyl]ethene | 5% |
| trans-1-(trans-4-butylcyclohexyl)-2-[trans-4-(3,4,5-trifluorophenyl)cyclohexyl]ethene | 7% |
| and as compounds expressed by the formula (7), | |
| trans-4-[2-(trans-4-propylcyclohexyl)ethyl]-4'-ethylstilbene | 3% |
| trans-2-fluoro-4-(trans-4-propylcyclohexyl)-4'-butylstilbene | 10% |

This composition exhibited a clearing point of 101.5° C., a viscosity of 36.9 mPa.s, an optical anisotropy of 0.138, a threshold voltage of 1.73 V, a voltage retention at 25.0° C. of 98.5% and a voltage retention at 70.0° C. of 97.9%. Further, ρo was $2.1 \times 10^{14}$ Ω.cm and ρH was $3.8 \times 10^{12}$ Ω.cm.

Effectiveness of the Invention

As apparent from Comparative examples and Examples, the liquid crystal composition of the present invention exhibits a reduced threshold voltage, while highly retaining the specific resistance value, i.e. the voltage retention, and has a suitably large optical anisotropy; hence when this liquid crystal composition is used, it is possible to provide AM-LCD of a low drive voltage, a low power consumption and a high speed response.

What is claimed is:

1. A liquid crystal composition which comprises
as a first component, at least one compound expressed by the formula (1):

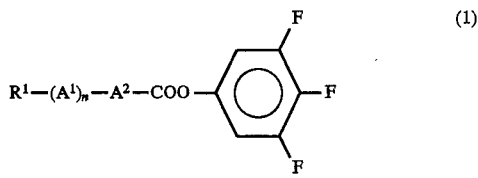

wherein $R^1$ represents an alkyl group of 1 to 10C; n represents 0 or 1; and $A^1$ and $A^2$ each independently represent trans-1,4-cyclohexylene or 1,4-phenylene, as a second component, at least one compound expressed by the formula (2):

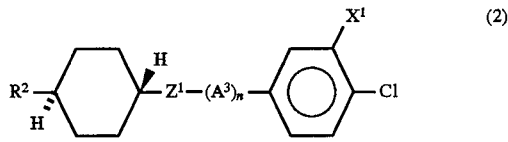

wherein $R^2$ represents an alkyl group of 1 to 10C; n represents 0 or 1; $Z^1$ represents —$C_2H_4$— or a single bond; $A^3$ represents trans-1,4-cyclohexylene or 1,4-phenylene; and $X^1$ represents H, F or Cl, as a third component, at least one compound chosen from among a group of compounds expressed by the formula (3):

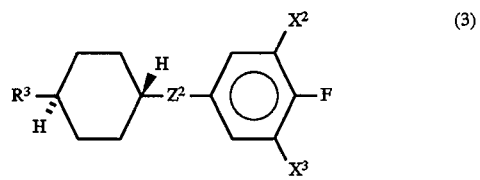

wherein $R^3$ represents an alkyl group of 1 to 10C; $Z^2$ represents —$C_2H_4$— or a single bond; and $X^2$ and $X^3$ each independently represent H or F;

the formula (4):

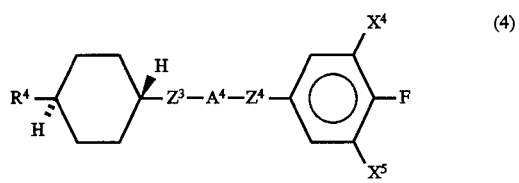

wherein $R^4$ represents an alkyl group of 1 to 10C; $Z^3$ and $Z^4$ each independently represent —$C_2H_4$— or a single bond; $A^4$ represents trans-1,4-cyclohexylene or 1,4-phenylene; and $X^4$ and $X^5$ each independently represent H or F or the formula (5):

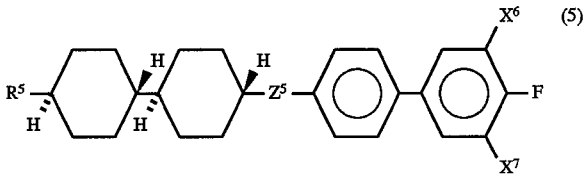

wherein $R^5$ represents an alkyl group of 1 to 10C; $Z^5$ represents —$C_2H_4$— or a single bond; and $X^6$ and $X^7$ each independently represent H or F.

2. A liquid crystal composition according to claim 1, wherein the proportion of the first component in the liquid crystal composition is 3 to 50% by weight, that of the second component therein is 3 to 40% by weight and that of the third component therein is 3 to 90% by weight.

3. A liquid crystal composition according to claim 1 or claim 2, further comprising a fourth component which is at least one compound chosen from among compounds expressed by the formula (6):

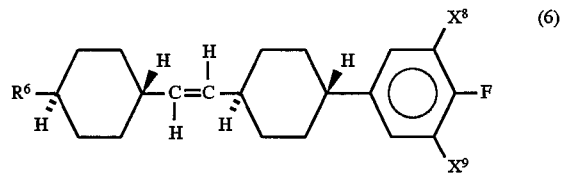

wherein $R^6$ represents an alkyl group of 1 to 10C; $X^8$ and $X^9$ each independently represent H or F, or the formula (7):

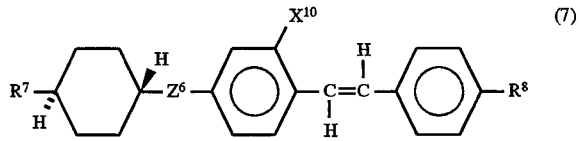

wherein $R^7$ and $R^8$ each independently represent an alkyl group of 1 to 10C; $Z^6$ represents —$C_2H_4$— or a single bond; and $X^{10}$ represents H or F.

4. A liquid crystal composition according to claim 3, wherein the proportion of the fourth component in the liquid crystal composition is 3 to 50% by weight.

5. A liquid crystal composition according to claim 1, wherein the compound constituting the first component, expressed by the formula (1) is a compound expressed by the formula (1a):

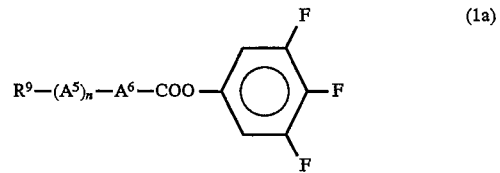

wherein $R^9$ represents a linear alkyl group of 1 to 10C; n represents 0 or 1; $A^5$ and $A^6$ each independently represent trans-1,4-cyclohexylene or 1,4-phenylene; but when $A^5$ is 1,4-phenylene, $A^6$ is 1,4-phenylene.

6. A liquid crystal composition according to claim 1, wherein the compound constituting the second component, expressed by the formula (2) is a compound expressed by the formulas (2a), (2b) or (2c):

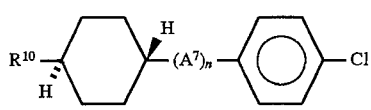 (2a)

wherein $R^{10}$ represents a linear alkyl group of 1 to 10C, n represents 0 or 1; and $A^7$ represents trans-1,4-cyclohexylene or 1,4-phenylene;

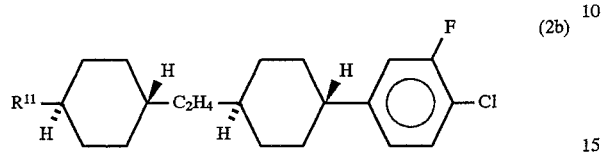 (2b)

wherein $R^{11}$ represents a linear alkyl group of 1 to 10C;

or

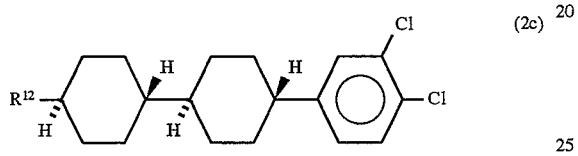 (2c)

wherein $R^{12}$ represents a linear alkyl group.

7. A liquid crystal composition according to claim 1, wherein the compound constituting the third component, expressed by the formula (3) is a compound expressed by the formula (3a):

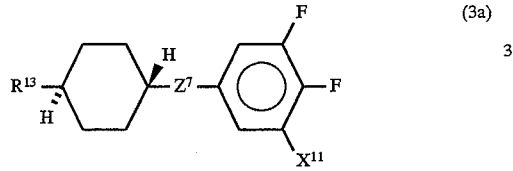 (3a)

wherein $R^{13}$ represents a linear alkyl group of 1 to 10C; $X^{11}$ represents H or F; $Z^7$ represents —$C_2H_4$— or a single bond when $X^{11}$ is H and $X^{11}$ represents a single bond when $X^{11}$ is F.

8. A liquid crystal composition according to claim 1, wherein the compound constituting the third component, expressed by the formula (4) is a compound expressed by the formulas (4a), (4b) or (4c):

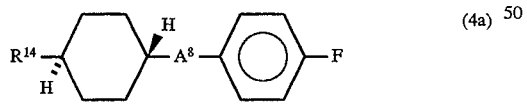 (4a)

wherein $R^{14}$ represents a linear alkyl group of 1 to 10C; and $A^8$ represents trans-1,4-cyclohexylene or 1,4-phenylene;

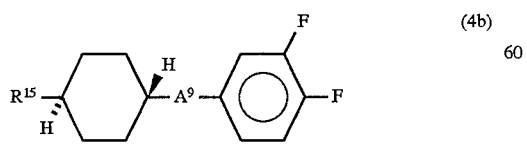 (4b)

wherein $R^{15}$ represents a linear alkyl group of 1 to 10C; and $A^9$ represents trans-1,4-cyclohexylene, 1,4-phenylene or

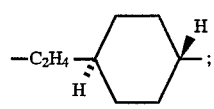

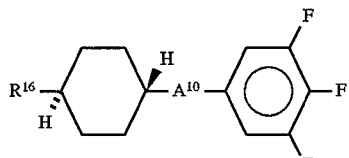 (4c)

wherein $R^{16}$ represents a linear alkyl group of 1 to 10C; and $A^{10}$ represents trans-1, 4-cyclohexylene, 1,4-pehnylene,

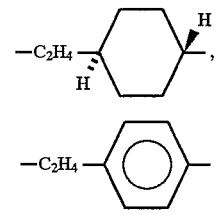

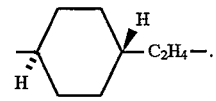

or

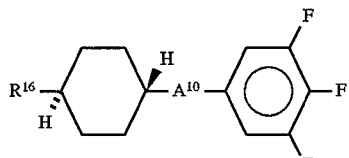

9. A liquid crystal composition according to claim 1, wherein the compound constituting the third component, expressed by the formula (5), is a compound expressed by the formula (5a):

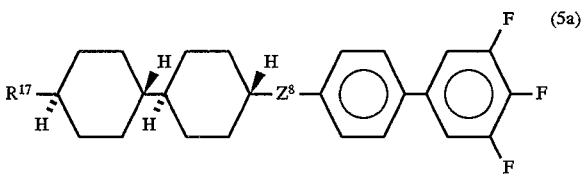 (5a)

wherein $R^{17}$ represents a linear alkyl group of 1 to 10C; and $Z^8$ represents —$C_2H_4$— or a single bond.

10. A liquid crystal composition according to claim 3, wherein the compound constituting the fourth component, expressed by the formula (6), is a compound expressed by the formula (6a):

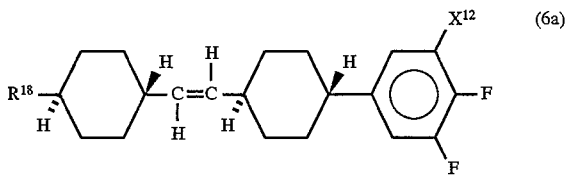 (6a)

wherein $R^{18}$ represents a linear alkyl group of 1 to 10C; and $X^{12}$ represents H or F.

11. A liquid crystal composition according to claim 3, wherein the compound constituting the fourth component, expressed by the formula (7), is a compound expressed by the formulas (7a) or (7b):

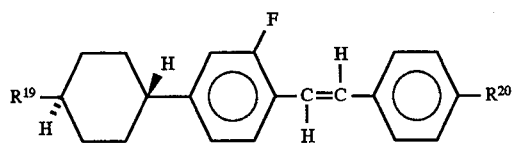

wherein $R^{19}$ and $R^{20}$ each independently represent a linear alkyl group of 1 to 10C or

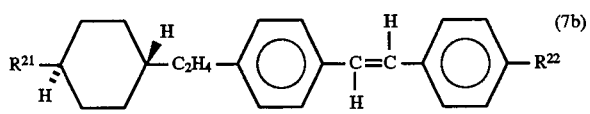

wherein $R^{21}$ and $R^{22}$ each independently represent a linear alkyl group of 1 to 10C.

12. An electrooptical display element comprising a liquid crystal composition according to any one of claims 1, 2 or 5–9.

13. An active matrix mode liquid crystal display element comprising a liquid crystal composition according to any one of claims 1, 2 or 5–9, wherein the product of the optical anisotropy (Δn) of the liquid crystal composition and the thickness (d μm) of the liquid crystal composition in a cell of the display element falls within 0.3 to 1.0.

14. An electrooptical display element comprising a liquid crystal composition according to claim 3.

15. An electrooptical display element comprising a liquid crystal composition according to claim 4.

16. An electrooptical display element comprising a liquid crystal composition according to claim 10.

17. An electrooptical display element comprising a liquid crystal composition according to claim 11.

18. An active matrix mode liquid crystal display element comprising a liquid crystal composition according to claim 3, wherein the product of the optical anisotropy (Δn) of the liquid crystal composition and the thickness (d μm) of the liquid crystal composition in a cell of the display element falls within 0.3 to 1.0.

19. An active matrix mode liquid crystal display element comprising a liquid crystal composition according to claim 4, wherein the product of the optical anisotropy (Δn) of the liquid crystal composition and the thickness (d μm) of the liquid crystal composition in a cell of the display element falls within 0.3 to 1.0.

20. An active matrix mode liquid crystal display element comprising a liquid crystal composition according to claim 10, wherein the product of the optical anisotropy (Δn) of the liquid crystal composition and the thickness (d μm) of the liquid crystal composition in a cell of the display element falls within 0.3 to 1.0.

21. An active matrix mode liquid crystal display element comprising a liquid crystal composition according to claim 11, wherein the product of the optical anisotropy (Δn) of the liquid crystal composition and the thickness (d μm) of the liquid crystal composition in a cell of the display element falls within 0.3 to 1.0.

* * * * *